United States Patent [19]
Costa

[11] Patent Number: 5,533,858
[45] Date of Patent: *Jul. 9, 1996

[54] TWO-AXIS CARTESIAN ROBOT

[76] Inventor: Larry J. Costa, 54201 Ash Rd., Osceola, Ind. 46561

[*] Notice: The term of this patent shall not extend beyond the expiration date of Pat. No. 5,476,358.

[21] Appl. No.: 398,911

[22] Filed: Mar. 6, 1995

Related U.S. Application Data

[63] Continuation-in-part of Ser. No. 343,136, Nov. 22, 1994, Pat. No. 5,476,358, which is a continuation of Ser. No. 887,317, May 22, 1992, abandoned.

[51] Int. Cl.$^6$ ...................................... B25J 9/00
[52] U.S. Cl. ......................... 414/751; 901/21; 74/490.04; 74/490.09
[58] Field of Search .......................... 414/749, 751–753, 414/490.03; 901/21; 74/490.04, 490.08, 490.09, 89.2, 89.21, 89.22

[56] References Cited

U.S. PATENT DOCUMENTS

| | | |
|---|---|---|
| 465,109 | 12/1891 | Dixon . |
| 3,344,933 | 10/1967 | Jelatis et al. .............................. 212/24 |
| 4,243,147 | 1/1981 | Twitchell et al. ....................... 212/159 |
| 4,417,845 | 11/1983 | Burton .................... 414/733 |
| 4,770,598 | 9/1988 | Kotani .................................. 414/752 |
| 4,820,109 | 4/1989 | Witt .................................... 414/282 |
| 4,842,476 | 6/1989 | Shiotani ................................ 414/751 |
| 4,922,173 | 5/1990 | Lawler ................................. 318/568.2 |
| 5,324,163 | 6/1994 | Costa ...................................... 414/571 |

FOREIGN PATENT DOCUMENTS 151362 of 1904 Germany .

*Primary Examiner*—Donald W. Underwood
*Attorney, Agent, or Firm*—Zarley, McKee, Thomte, Voorhees & Sease; Dennis L. Thomte

[57] ABSTRACT

A two-axis Cartesian robot is described comprising a first horizontally disposed support having a first carriage selectively movably mounted thereon. A second support is operatively secured to the first carriage and extends perpendicularly with respect to the longitudinal axis of the first support. A belt pulley is rotated by a reversible drive motor and is operatively connected to the upper and lower ends of the second support by a pulley arrangement. A horizontal brake is provided to control the movement of the carriage with respect to the first support. A vertical brake is provided to control the movement of the second support with respect to the carriage. A workpiece handling member is mounted on the lower end of the second support for manipulating the workpiece being handled.

7 Claims, 3 Drawing Sheets

TWO-AXIS CARTESIAN ROBOT

This is a continuation-in-part application of application Ser. No. 08/343,136 filed Nov. 22, 1994, entitled "Three-Axis Cartesian Robot", now U.S. Pat. No. 5,476,358 which is a continuation application of application Ser. No. 07/887,317 filed May 22, 1992, now abandoned.

BACKGROUND OF THE INVENTION

1. Field of the Invention

This invention relates to a Cartesian robot and more particularly to a two-axis Cartesian robot.

2. Description of the Prior Art

Many types of robotic designs have been previously provided, but they all suffer from one or more shortcomings. To the best of applicant's knowledge, other than the robot described in the co-pending application, the prior Cartesian robot devices require one drive motor for each axis of movement.

During the production of the robot described in the co-pending application, it was discovered that a two-axis Cartesian robot provided many advantages over the three-axis design. The basic principle of the robot described herein is similar to that described in the co-pending application, except that the robot operates along two axes instead of three.

SUMMARY OF THE INVENTION

A two-axis Cartesian robot is described which includes a single drive motor for driving the robot in two directions of movement, namely the Y and Z axes.

The robot of this invention includes a first horizontally disposed support having a first carriage longitudinally movably mounted thereon. A selectively reversible drive motor is mounted on one end of the first support and has a rotatable drive shaft provided thereon. A synchronous belt drive pulley is mounted on the drive shaft and has a synchronous belt wrapped therearound. The synchronous belt defines upper and lower belt members extending from the belt drive pulley in a direction parallel to the longitudinal axis of the first support. A vertically disposed second support is vertically movably mounted on the carriage. A first brake is operatively connected to the carriage for selectively limiting the movement of the carriage with respect to the first support. A second brake is operatively secured to the second support for selectively limiting the vertical movement of the second support relative to the carriage. The synchronous belt members are operatively connected to the second support so that the robot may be moved in the Y and Z axes. The design of the system of this invention consists of two axes of motion with only a single drive mechanism.

It is therefore the principal object of the invention to provide a two-axis Cartesian robot design.

Yet another object of the invention is to provide a two-axis Cartesian robot requiring only one axis of drive motion for the two axes of movement.

Still another object of the invention is to provide a two-axis Cartesian robot employing belt members wrapped around a synchronous drive belt pulley.

Still another object of the invention is to provide a unique braking system for a two-axis Cartesian robot to achieve movement of the robot in two directions, namely the Y and Z axes.

Still another object of the invention is to provide a two-axis Cartesian robot which is economical in manufacture, durable in use and refined in appearance.

These and other objects will be apparent to those skilled in the art.

DESCRIPTION OF THE PREFERRED EMBODIMENT

Figure 1:
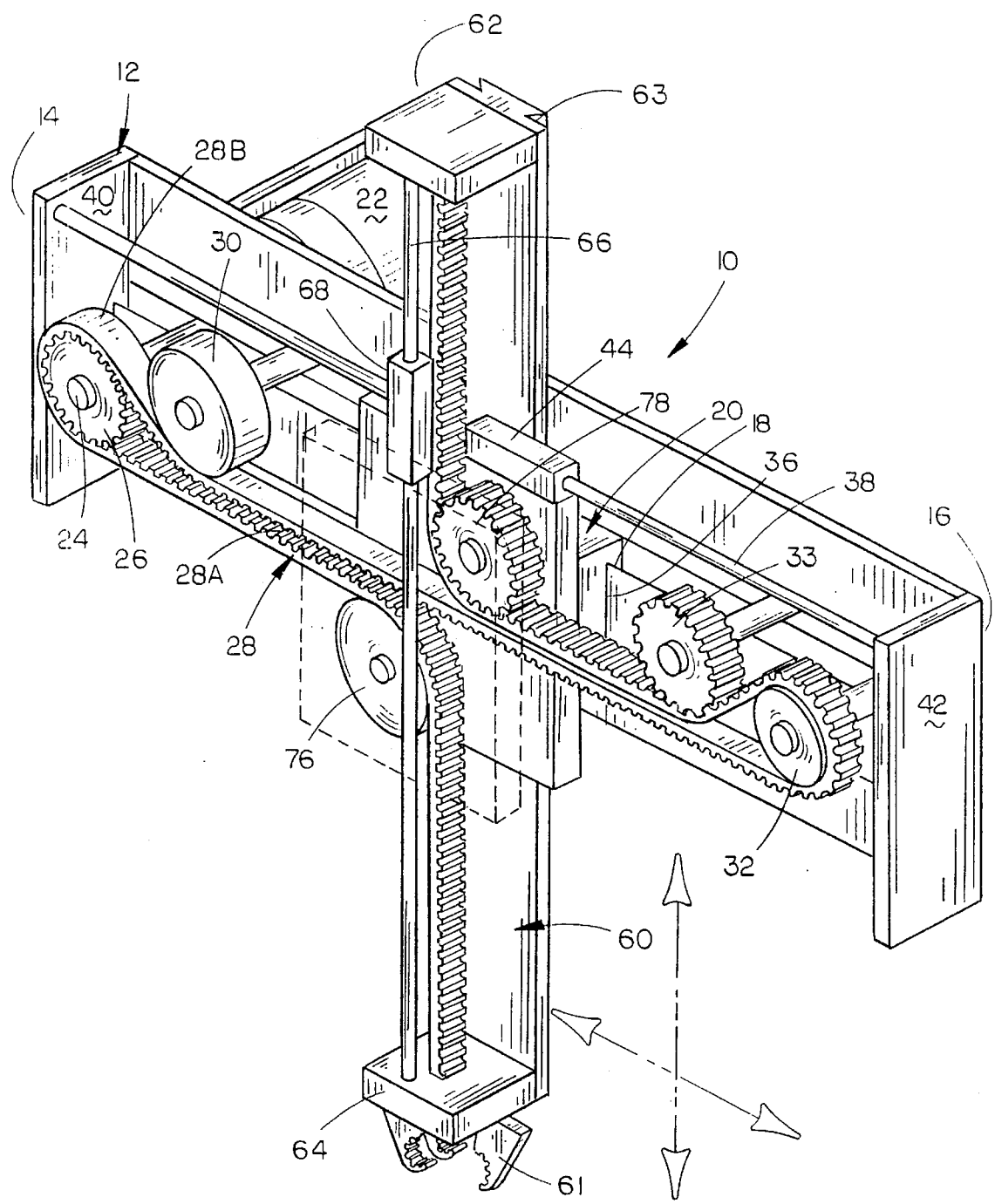
FIG. 1 is a perspective view of the robot of this invention.
Figure 2:
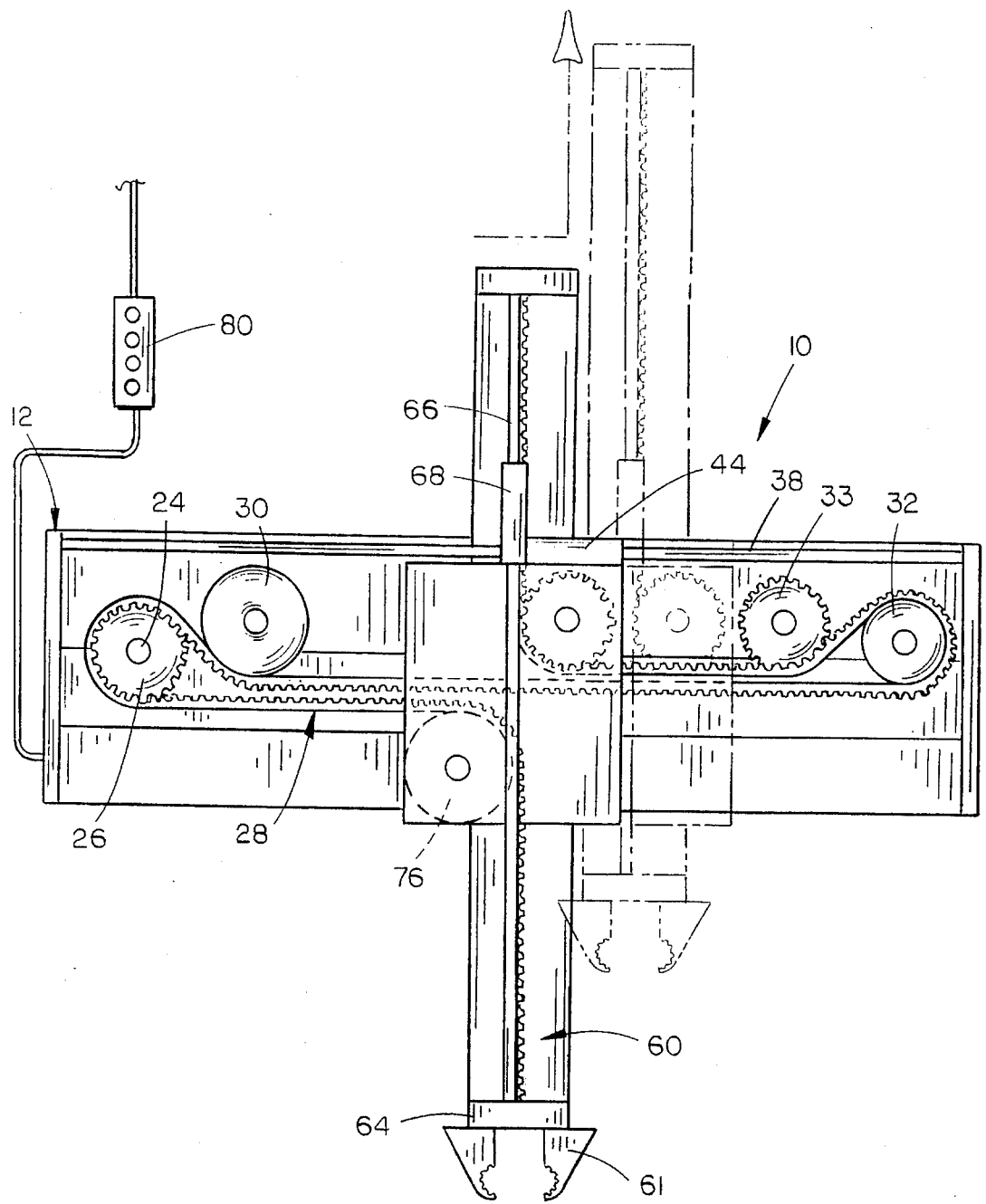
FIG. 2 is a front view of the robot of this invention.
Figure 3:
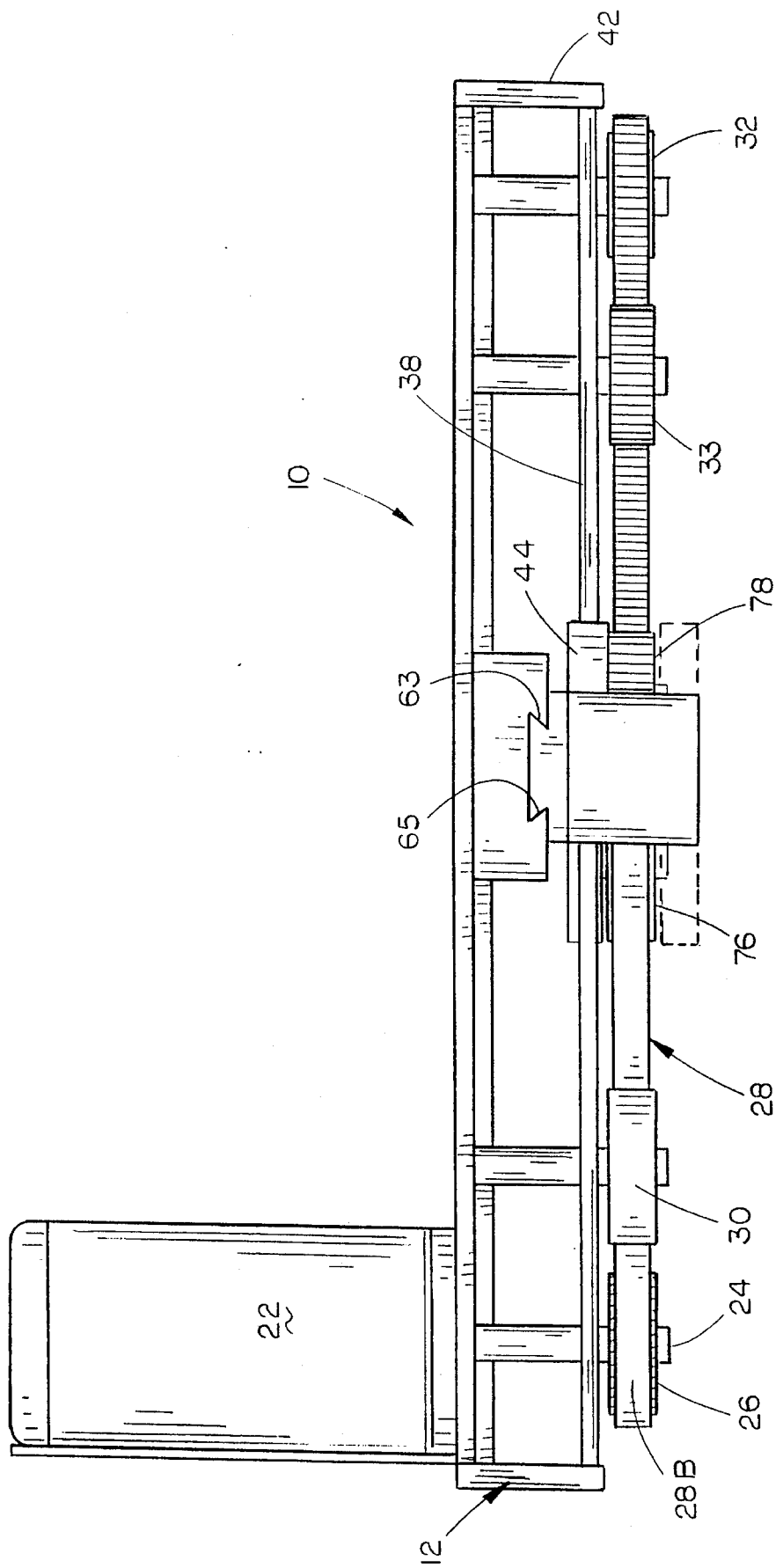
FIG. 3 is a top view of the robot of FIGS. 1 and 2.

Referring to FIG. 1, the numeral 10 refers generally to the two-axis Cartesian robot of this invention. Robot 10 includes a first support 12 which is horizontally disposed and which has opposite ends 14 and 16. Support 12 includes a laterally presented dovetail design 18 upon which is movably mounted a first carriage 20 as will be described in more detail hereinafter.

Reversible drive motor 22 is mounted on support 12 adjacent end 14 and has a horizontally disposed drive shaft 24 extending therefrom. The numeral 26 refers to a conventional synchronous belt drive pulley mounted on shaft 24 adjacent end 14. A synchronous belt member 28 is wrapped around pulley 26, as viewed in FIG. 1, and extends therefrom in a direction parallel to the longitudinal axis of support 12. For purposes of description, belt member 28 will be described as including a first belt portion 28A and a second belt portion 28B. Thus, rotation of pulley 26 in a clockwise direction, as viewed in FIG. 1, will cause the synchronous belt portion 28B to playout from pulley 26 and will cause synchronous belt portion 28A to be taken-up on the pulley 26. Conversely, rotation of the synchronous belt pulley 26 in a direction opposite to that just described will cause the synchronous belt portion 28A to be played-out from pulley 26 and will cause synchronous belt portion 28B to be taken-up on pulley 26. As used herein, "played-out" means that the belt portion moves away from the pulley 26 while "taken-up" means that the belt portion moves towards the pulley 26.

The numeral 30 refers to an idler pulley rotatably mounted on support 12 adjacent pulley 26. The axis of rotation of pulley 30 is parallel to the axis of shaft 24. Idler pulley 33 is also rotatably mounted on support 12 as seen in FIG. 1. The numeral 32 refers to an idler pulley which is rotatably mounted on support 12 adjacent end 16 with the axis of rotation of the idler pulley 32 being parallel to the axis of shaft 24.

The first carriage 20 is longitudinally slidably movably mounted on support 12 by means of the conventional dovetail design 36 receiving the dovetail design 18 of the support 12. As seen in FIG. 1, the numeral 38 refers to an elongated rod which is horizontally disposed and which extends between the brackets 40 and 42 mounted on support 12. The numeral 44 refers to a conventional brake which is mounted on carriage 20 and which is adapted to selectively grip rod 38 in a braking relationship so as to selectively prevent the movement of carriage 20 relative to support 12 as desired.

The numeral 60 refers to a vertically disposed support which is vertically movably mounted on carriage 20 and which has an upper end 62 and lower end 64. Support 60 includes a dovetail design 63 which embraces dovetail design 65 on carriage 20. An elongated rod 66 is secured to support 60 and extends between the upper and lower ends thereof as seen in FIG. 1. The numeral 68 refers to a conventional brake mounted on carriage 20 which is adapted to selectively engage rod 66 in a braking relationship to prevent movement of the second support 60 relative to carriage 20 as desired. Idler pulleys 76 and 78 are rotatably mounted on carriage 20 with the axes of rotation thereof being disposed in a horizontal orientation which is parallel to the axis of shaft 24.

As seen in FIG. 1, belt portion 28A extends from pulley 26, around idler pulley 76, and thence downwardly for fixed connection with the lower end of support 60. As also seen in FIG. 1, belt portion 28B extends from pulley 26, beneath idler pulley 30, beneath and around idler pulley 32, beneath idler pulley 33, beneath and around idler pulley 78 and thence upwardly for fixed connection to the upper end of support 60.

In operation, assuming that brakes 44 and 68 are initially engaged with their respective rods, carriage 20 and support 60 may be moved horizontally as a unit, with respect to support 12, by operating drive motor 22 and disengaging brake 44 which serves as a horizontal brake. For example, if it is desired to move support 60 towards end 14 of support 12, horizontal brake 44 is first disengaged and then motor 22 is operated to cause pulley 26 to be rotated in a clockwise direction, as viewed in FIG. 1, so that belt portion 28A is taken-up on pulley 26 and so that belt portion 28B is played-out from pulley 26. Conversely, if it desired to move support 60 towards end 16 of support 12, horizontal brake 44 is first disengaged and then motor 22 is operated to cause pulley 26 to be rotated in a counterclockwise direction, as viewed in FIG. 1, so that belt portion 28A is played-out from pulley 26 and so that belt portion 28B is taken-up on pulley 26.

Support 60 may be selectively vertically moved, with respect to carriage 20, by operating drive motor 22 and disengaging brake 68, which serves as a vertical brake. For example, if it desired to move support 60 upwardly with respect to support 12, vertical brake 68 is first disengaged and then motor 22 is operated to cause pulley 26 to be rotated in a clockwise direction, as viewed in FIG. 1, so that belt portion 28A is taken-up on pulley 26 and so that belt portion 28B is played-out from pulley 26. Conversely, if it is desired to move support 60 downwardly with respect to support 12, vertical brake 68 is first disengaged and then motor 22 is operated to cause pulley 26 to be rotated in a counterclockwise direction, as viewed in FIG. 1, so that belt portion 28A is played-out from pulley 26 and so that belt portion 28B is taken-up on pulley 26.

The lower end of support 60 would include the necessary conventional components 61 positioned thereon to grasp or move the workpieces being manipulated. Further, the robot would include the necessary conventional controls 80 to operate the drive motor 22 and brakes 44 and 68.

It is preferred that idler pulleys 30 and 33 be utilized, although it is possible to omit the same in certain configurations. It is also possible to replace the belt 28 with a cable if so desired.

Thus, it can be seen that a novel two-axis Cartesian robot has been provided which requires only a single axis of drive motion for the two axes of movement. It can also be seen that the robot of this invention achieves all of the stated objectives.

I claim:

1. A two-axis Cartesian robot, comprising:

a first elongated and horizontally disposed support means having first and second ends;

said first support means having a first belt pulley rotatably mounted thereon adjacent its said first end;

said first support means having a first idler pulley mounted thereon adjacent said second end thereof;

a first carriage longitudinally horizontally movably mounted on said first support means;

said first carriage having second and third idler pulleys rotatably mounted thereon;

a first brake means mounted on said first carriage for selectively preventing longitudinal movement of said first carriage with respect to said first support means;

a second elongated and vertically disposed support means operatively vertically movably mounted on said first carriage and having its longitudinal axis disposed in a direction transverse to the longitudinal axis of said first support means;

said second support means having upper and lower ends;

a second brake means interconnecting said first carriage and said second support means for selectively preventing the movement of said second support means with respect to said first carriage;

a reversible drive motor mounted on said first support means adjacent the said first end thereof and being operatively connected to said first belt pulley;

an elongated flexible belt means for selectively moving said first carriage with respect to said first support means and for vertically moving said second support means with respect to said first carriage;

said belt means extending upwardly from a fixed connection adjacent said lower end of said second support means, thence around said second idler pulley, thence towards said first end of said first support means, thence around said belt pulley, thence towards said second end of said first support means, thence beneath and around said first idler pulley, thence beneath said third idler pulley, thence upwardly to a fixed connection adjacent the upper end of said second support means;

a first workpiece handling apparatus operatively secured to said second support means;

and control means for controlling the operation of said drive motor means, said first brake means and said second brake means.

2. The robot of claim 1 wherein said first brake means comprises a horizontal brake and said second brake means comprises a vertical brake.

3. The robot of claim 1 wherein said first workpiece handling apparatus is operatively secured to the lower end of said second support means.

4. The robot of claim 1 wherein a fourth idler pulley is rotatably mounted on said first support means between first belt pulley and said first carriage and wherein said belt means extends beneath said fourth idler pulley.

5. The robot of claim 4 wherein a fifth idler pulley is rotatably mounted on said first support means between said first idler pulley and said first carriage and wherein said belt means extends beneath said fifth idler pulley.

6. The robot of claim 1 wherein an elongated, vertically disposed rod is secured to and extends between said upper and lower ends of said second support means and wherein said second brake means is in selective braking engagement with said vertically disposed rod.

7. The robot of claim 6 wherein an elongated, horizontally disposed rod is secured to and extends between said first and second ends of said first support means and wherein said first brake means is in selective braking engagement with said horizontally disposed rod.

* * * * *